United States Patent [19]

Watanabe et al.

[11] 4,397,443

[45] Aug. 9, 1983

[54] SOLENOID VALVE ASSEMBLY

[75] Inventors: Tsukasa Watanabe, Toyota; Hiroyuki Amano; Naoji Sakakibara, both of Chiryu, all of Japan

[73] Assignee: Aisin Seiki Kabushiki Kaisha, Kariya, Japan

[21] Appl. No.: 271,996

[22] Filed: Jun. 9, 1981

[30] Foreign Application Priority Data

Jul. 11, 1980 [JP] Japan ............................ 55-98483[U]

[51] Int. Cl.³ ............................................. F16K 31/06
[52] U.S. Cl. ..................................... 251/129; 251/138
[58] Field of Search ......................... 251/129, 138, 141

[56] References Cited

U.S. PATENT DOCUMENTS

| 2,993,149 | 7/1961 | Persons | 251/138 X |
| 3,589,672 | 6/1971 | Hoolloman | 251/129 |
| 3,768,772 | 10/1973 | Vischulis | 251/129 |
| 3,861,643 | 1/1975 | Moffatt | 251/141 X |
| 3,934,816 | 1/1976 | Terrell et al. | 251/141 |
| 4,170,339 | 10/1979 | Ueda et al. | 251/138 |
| 4,205,593 | 6/1980 | Sakakibara | 251/138 X |

FOREIGN PATENT DOCUMENTS 471427 9/1937 United Kingdom ................ 251/129

Primary Examiner—Arnold Rosenthal
Attorney, Agent, or Firm—Oblon, Fisher, Spivak, McClelland & Maier

[57] ABSTRACT

A solenoid valve assembly having a valve member, disposed in a casing, movable between first and second positions for controlling communication between an inlet port and an outlet port provided in the casing which includes an armature of magnetic material operatively connected with the valve member, a leaf spring fixed at a first end thereof to the armature and biasing the valve member to the first position, a spring retainer having a first end portion which retains a second end of the leaf spring and which is stationarily fixed at a second end portion thereof to the casing, a stationary core of magnetic material mounted in the casing and operatively engageable with the armature and a mechanism acting on the stationary core and the armature for rotating the armature towards the stationary core whereby the valve is moved to the second position and an adjusting mechanism connected to the casing for adjusting tensioning of the leaf spring.

6 Claims, 1 Drawing Figure

U.S. Patent   Aug. 9, 1983   4,397,443
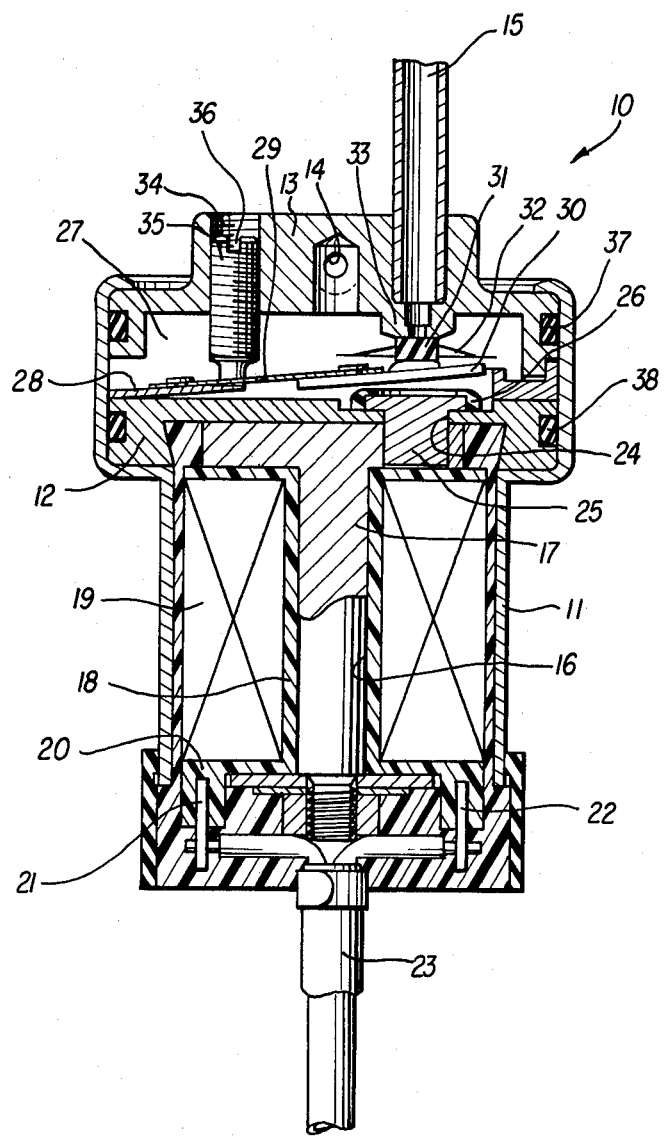

SOLENOID VALVE ASSEMBLY

BACKGROUND OF THE INVENTION

1. Field of the Invention

The present invention relates to a solenoid valve assembly and more particularly to improvement of an electrically operated type valve which is operated in accordance with an energized and deenergized condition of the solenoid coil.

2. Description of the Prior Art

A conventional solenoid valve assembly is disclosed for example in U.S. Pat. No. 4,170,339 granted on Oct. 9, 1979 to Ueda et al. which sets forth an electromagnetic valve including a magnetic circuit formed by a stationary core and a movable core, or armature pivoted at one end of the stationary core and rotatable continuously between first and second positions with a free end positioned in opposed relation to the other end of the stationary core with an air gap therebetween. The armature is spring biased so as to remain in the first position and carries a valve head for engagement with a valve seat. The opposing ends of the stationary and movable cores are so shaped as to form in the air gap a first working section in which the main magnetic flux generates a vector component transverse to the length of the armature and a second working section in which the main magnetic flux generates a vector component parallel to the length of the armature. The resulting vector makes the angular displacement of the armature linearly proportional to the supply current. In particular, such conventional solenoid valve assembly includes an armature member of magnetic material pivoted on a recess on a knife edge, a valve member mounted on one end of the armature, a coiled spring connected at an opposite end of the armature to thereby bias the armature in a clockwise direction, and a magnetic circuit for urging the armature in a counterclockwise direction against the force of a spring to thereby operate the valve.

In the above valve arrangement, the durability of the valve may be lessened because both the recess of armature and knife edge portion are defaced by rubbing motion caused by rotation of the armature. Thus both the entire valve and armature are biased to the knife edge portion whereby the valve engages the valve seat at an angle of inclination in the clockwise direction against a horizontal direction of orientation of the valve seat.

Therefore, the valve does maintain sealing engagement with the valve seat.

SUMMARY OF THE INVENTION

An object of the present invention is therefore to provide a solenoid valve assembly which overcomes the above-noted disadvantages of the conventional solenoid valve assembly.

Another object of the present invention is to provide an improved solenoid valve assembly which is low in cost and simple in construction.

According to the invention, the valve assembly includes an armature of magnetic material which is operatively connected with a valve member at one end thereof, a leaf spring fixed to the armature at one end thereof, a spring retainer which retains the other end of leaf spring at one end thereof and which is stationarily fixed at the other end thereof, and an adjusting member for adjusting the tension of the leaf spring. As a result, the pivoting member including an armature does not experience a rubbing motion.

BRIEF DESCRIPTION OF THE DRAWINGS

Various objects, features and attendant advantages of the present invention will therefore be more clearly understood with reference to the enclosed FIGURE wherein:

The sole FIGURE is a cross-sectional view showing one embodiment of solenoid valve assembly according to the present invention.

DETAILED DESCRIPTION OF THE PREFERRED EMBODIMENT

A solenoid valve assembly 10 includes a casing 11. A blocking member 12 and a valve cover 13 are sealingly inserted at the upper portion of casing 11.

Valve cover 13 has inlet port 14 and outlet port 15 for passage of atmospheric air. A stationary core 17 of magnetic material is sealingly mounted in a hole 16 disposed in a lower portion of casing 11.

A solenoid coil 19 is mounted on a bobbin 18 positioned at the outer circumference of hole 16. Solenoid coil 19 is in electrical communication with lead wire 23 passing through terminals 21, 22 mounted on a base plate portion 20 of bobbin 18.

An upper core 25 of magnetic material magnetically connected with stationary core 18 is separately mounted in a hole 24 formed in blocking member 12 and an upper portion of core 17. A cushioning ring 26 is mounted on the outer circumference of the upper portion of upper core 25.

A valve chamber 27 is formed in casing 11 and is in continuous communication with outlet port 14. A valve member 31 is mounted on a sealing spring 32 connected with valve cover 13 by a connecting member (not shown), and is biased in a direction of disengagement from a valve seat 33 positioned on the outer circumference of inlet port 15.

An armature 30 of magnetic material is fixed to one end of a leaf spring 29 and is biased in a counterclockwise direction against sealing spring 32 by leaf spring 29 whereby valve member 31 is held in pressure contact with valve seat 33. A spring retainer 28 is fixed to blocking member 12 at one end thereof. An opposite end of spring retainer 28 retains the opposite end of leaf spring 29.

An adjusting screw 35 having a recess 36 formed therein for adjustable positioning is threaded into a hole 34 formed in blocking member 13 and serves to directly contact the opposite end of spring retainer 28 thereby permitting indirect adjustment of the tension of leaf spring 29 to force valve member 31 to be held in pressure contact with valve seat 33. Numerals 37 and 38 designate first and second seal rings, respectively.

When no current is supplied to coil 19, valve member 31 is forced into pressure contact with valve seat 33 against sealing spring 32 by leaf spring 29 so as to close the outlet port 15 as shown in the sole FIGURE. On the other hand, when current is supplied to coil 19, stationary core 17 and upper core 25 are magnetized whereby armature 30 is shifted downwardly in opposition to the force of leaf spring 29 so as to disengage valve member 31 from pressure contact with valve seat 33, thereby communicating outlet port 15 with inlet port 14 and allows for communication of atmospheric air therefrom.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A solenoid valve assembly having a valve member disposed in a casing, movable between first and second positions for controlling communication between an inlet port and an outlet port provided in said casing comprising:
   an armature of magnetic material operatively connected with said valve member;
   a leaf spring fixed at a first end thereof to said armature and biasing said valve member to said first position;
   a spring retainer having a first end portion which retains a second end of said leaf spring and which is stationarily fixed at a second end portion thereof to said casing;
   stationary core means of magnetic material mounted in said casing and operatively engageable with said armature;
   means acting on said stationary core means and said armature for rotating said armature toward said stationary core means whereby said valve is moved to said second position; and
   means connected to said casing and engaging said first end portion of said spring retainer for indirectly adjusting tensioning of said leaf spring.

2. A solenoid valve assembly as set forth in claim 1, wherein said adjusting means comprises an adjusting screw threadably engaging said casing and engaging said first end portion of spring retainer.

3. A solenoid valve assembly as set forth in claims 1 or 2, further comprising a blocking member mounted in said casing between said stationary core means and said armature and connected to said second end portion of said spring retainer.

4. A solenoid valve assembly as set forth in claim 3, wherein said stationary core means further comprises a stationary core member and wherein said armature is moved towards said upper core member when said valve is moved to said second position.

5. A solenoid valve assembly as set forth in claim 4, further comprising a cushioning ring mounted on the outer circumference of an upper portion of said upper core member.

6. A solenoid valve assembly as set forth in claim 1 further comprising a blocking member mounted in said casing, having an opening formed therein and connected to said second end portion of said spring retainer wherein said stationary core means further comprises a stationary core member and a separate upper core member mounted in said opening in said blocking member and wherein said armature is moved towards said separate upper core member when said valve is moved to said second position.

* * * * *